United States Patent [19]

Uematsu et al.

[11] Patent Number: 5,332,544
[45] Date of Patent: Jul. 26, 1994

[54] HIGH-ALUMINUM-CONTAINING FERRITIC STAINLESS STEEL HAVING IMPROVED HIGH-TEMPERATURE OXIDATION RESISTANCE

[75] Inventors: Yoshihiro Uematsu; Katsuhisa Miyakusu; Naoto Hiramatsu, all of Yamaguchi, Japan

[73] Assignee: Nisshin Steel Co., Ltd., Tokyo, Japan

[21] Appl. No.: 106,800

[22] Filed: Aug. 16, 1993

Related U.S. Application Data

[63] Continuation of Ser. No. 852,647, Mar. 17, 1992, Pat. No. 5,286,442.

[30] Foreign Application Priority Data

May 29, 1991 [JP] Japan .................. 3-154085

[51] Int. Cl.⁵ ............................... C22C 38/22
[52] U.S. Cl. .......................... 420/40; 420/63
[58] Field of Search ............ 420/40, 63; 148/325

[56] References Cited

U.S. PATENT DOCUMENTS 4,859,649  8/1989  Bönke et al. .................. 420/40

FOREIGN PATENT DOCUMENTS 1121099  4/1956  Fed. Rep. of Germany .
552369   4/1977  U.S.S.R. .
833446   5/1956  United Kingdom .

Primary Examiner—Deborah Yee
Attorney, Agent, or Firm—Nikaido, Marmelstein, Murray & Oram

[57] ABSTRACT

A ferric stainless steel consists by weight of less than 0.03% carbon, less than 1% silicon, less than 1% manganese, less than 0.04% phosphorus, less than 0.03% sulphur, from 15% to 25% chromium, less than 0.03% nitrogen, from 3% to 6% aluminum, from 0.1% to 4% molybdenum. A small amount of rare-earth elements and yttrium of from 0.01% to 0.15% are added in the steel.

2 Claims, 1 Drawing Sheet

HIGH-ALUMINUM-CONTAINING FERRITIC STAINLESS STEEL HAVING IMPROVED HIGH-TEMPERATURE OXIDATION RESISTANCE

This application is a continuation of application Ser. No. 07/852,647 filed Mar. 17, 1992, now U.S. Pat. No. 5,286,442.

BACKGROUND OF THE INVENTION

The present invention relates to a high-aluminum-containing ferritic stainless steel which is used in high-temperature such as a catalyst in an emission control system for motor vehicles, a heating device, and others.

The high-aluminum ferritic stainless has a high oxidation resistance at high temperature so that it is extensively used for materials in heating devices such as a stove pipe, and electric heater elements.

Ceramics have heretofore been used as a catalyst carrier of a catalytic converter provided in an emission control system for motor vehicles, and ferritic stainless steel is now beginning to be used instead. One of the defects of the ceraraic is that the ceramic is vulnerable to thermal shock. Another is that the ceramic has a high heat capacity. Consequently, when the ceramic is used for a catalyst carrier, a long time is required to be heated to a catalyst reacting temperature. A metallic carrier made of high-aluminum ferritic stainless steel has not such defects as the ceramic.

The stainless steel is formed into a sheet of foil having a thickness of about 50μm to be used as a catalyst carrier for catalytic converters. Since abnormal oxidation is liable to occur on the foil and the converter is used in an atmosphere of exhaust gases which is severe oxidation conditions, the foil must have extremely resistive characteristics against high-temperature oxidation. To meet the requirements, a high-aluminum-containing ferritic stainless steel including 20Cr-5Al as a base, rare-earth elements and yttrium is used. However, such a stainless steel does not have sufficient high-temperature oxidation resistance, so that an extended use of the steel causes abnormal oxidation.

In addition, from the point of global warming and public nuisance, stricter limits have been imposed on emission control. To comply with the standards, it is necessary to quickly heat the catalyst to the catalyst reacting temperature after the start of the engine. To this end, the temperature of exhaust gas is elevated, or the converter is positioned directly under an exhaust manifold. On the other hand, the power of the engine tends to be increased in recent years, which causes also increase of the temperature of the exhaust. These conditions enhance oxidation and corrosion of the catalyst carrier. Therefore, it is imperative to provide a high-aluminum-containing ferritic stainless steel having improved high-temperature oxidation resistance.

In order to improve the resistance of the high-aluminum-containing ferritic stainless steel against high-temperature oxidation, contents of chromium, aluminum, rare earth elements and yttrium are increased, which is disclosed in Japanese Patent Application Laid-Open 63-45351. However, slabs and hot-rolled plates made of such a stainless steel are poor in toughness and hence, in productivity. More particularly, increase in chromium and aluminum contents causes not only rise in the cost of the component material, but also decreases productivity due to poor toughness. As a consequence the yield of the stainless steel decreases, thereby extremely increasing the manufacturing cost, or the production becomes altogether impossible. Alternatively, the rare-earth elements and yttrium are added to promote high-temperature oxidation resistance. However, excessive quantity of these elements rather decreases the high-temperature oxidation resistance, and causes deterioration in toughness.

In addition, the ferritic stainless steel foil of the catalytic converter is subjected to heat cycles where heating and cooling are repeated, thereby causing deformation of the foil. Thus, the catalyst carrier must have high heat resistance.

SUMMARY OF THE INVENTION

An object of the present invention is to provide a ferritic stainless steel where the high-temperature oxidation resistance is improved without increasing contents of components, thereby improving production by of the steel.

According to the present invention, there is provided new ferritic stainless steel excellent in high temperature oxidation resistance, which consists by weight of under 0.03% carbon, under 1% silicon, under 1% magnese, under 0.04% phosphorus, under 0,003% sulphur, from 15% to 25% chromium, under 0.03% nitrogen, from 3% to 6% alumina, more than 1-5% but up 4% molybdenura, and from 0.01% to 0.15% in total of one or more rare-earth elements and yttritum and the balance being Fe except for inevitable impurities.

By weight of 0.05% to 1% in total of one or more of niobium, vanadium and titanium may be arbitarily included in the material.

Namely, when molybdenum and small quantities of rare earth elements and yttrium are included in the high-aluminum containing ferritic stainless steel, high-temperature oxidation resistance and heat resistance are improved so as to be applicable to a catalyst carrier in an emission control system for motor vehicles, heating devices and electric heater elements.

The other objects and features of this invention will become understood from the following description with reference to the accompanying drawings.

BRIEF DESCRIPTION OF DRAWINGS

The FIGURE is a graph showing a relationship between a quantity of molybdenum and a time elapsed before the occurrence of abnormal oxidation.

DETAILED DESCRIPTION OF THE PREFERRED EMBODIMENTS

Figure 1:
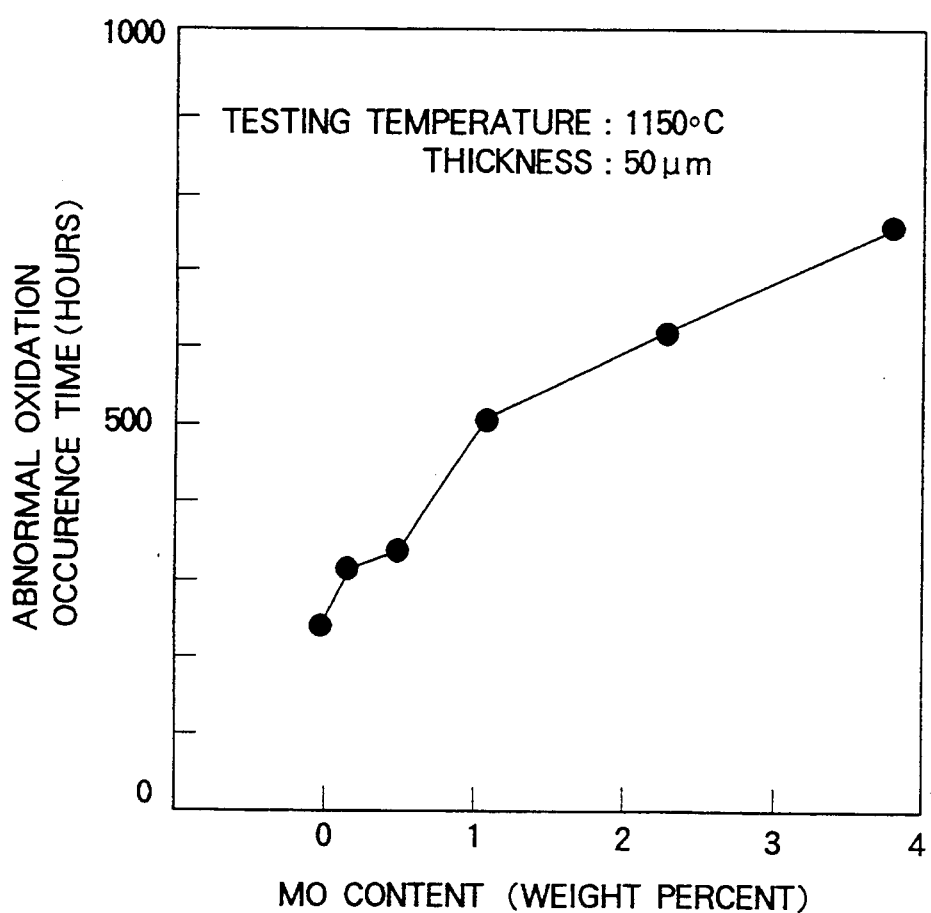

Content of each component and reason for numerical limitation of the content are described hereinafter.

(Carbon C)

Excessive content of carbon in high-aluminum-containing ferritic stainless steel induces abnormal oxidation and decreases toughness of the slabs and hot foils. The decrease of the toughness causes reduction of productivity of the steel. Therefore, the maximum content of the carbon is limited to 0.03% by weight in the present invention.

(Silicon Si)

Silicon increases the hardness of the ferritic stainless steel and hence decreases the toughness thereof so that the content thereof is under 1% by weight.

(Manganese Mn)

Manganese, although effective in enhancing hot workability, decreases the high-temperature oxidation resistance. Thus the content of the manganeses is limited to under 1% by weight.

(Phosphorus P)

Since phosphorus affects the high-temperature oxidation resistance, it is preferable to limit the content thereof as small as possible. In addition, phosphorus also reduces toughness of the hot-rolled plate. Thus, the content of phosphorus is set under 0.04% by weight.

(Sulphur S)

Sulphur combines with rare-earth elements and yttrium to form a nonmetallic inclusion which affects the surface quality of stainless steel. Sulphur may further decrease the effective quantities of the rare earth elements and yttrium which are effective in improving oxidation resistance. The significance of theses defects intensifies if over 0.003% by weight of sulphur is included. Hence under 0.003% by weight, preferably under 0.002% by weight of sulphur is included.

(Chromium Cr)

Chromium is a basic element for improving high-temperature oxidation resistance. Content in excess of 15% by weight of chronium is necessary for effectuating the improvement. However, if chromium in excess of 25% by weight is included, toughness of slab and hot foil deteriorates, thereby reducing productivity. Hence the chromium content is between 15% to 25% by weight.

(Nitrogen N)

Nitrogen, when reacted with aluminum, forms aluminum nitride (AlN) which induces abnormal oxidation. As the content of nitrogen is increased, toughness of the stainless steel deteriorates. Hence the content of nitrogen is under 0.03% by weight.

(Aluminum Al)

Aluminum, as well as chromium, is a significant element in maintaining the high-temperature oxidation resistance of the stainless steel. More particularly, an aluminum oxide film ($Al_2O_3$) is formed on the surface of the stainless steel by adding aluminum. The aluminum oxide film promotes the resistance. In order to restrain abnormal oxidation, which is liable to occur on foil having a thickness under 100 $\mu$m, aluminum contents over 3% by weight should be included so as to form sufficient aluminum oxide film on the surface. However, if the content of aluminum exceeds 6% by weight, the toughness of slab and hot foil deteriorates. Thus, the aluminum content is from 3% to 6% by weight.

(Molybdenum Mo)

Since molybdenum causes a highly volatile oxide, it has been thought as an element which aggravates the high-temperature resistance. However, the inventors of the present invention have found on the contrary that molybdenum improves the high-temperature resistance, as well as heat resistance of the steel. The effect becomes apparent when the molybdenum content is over 0.1% by weight as shown in the graph of the FIGURE. The improvement in high-temperature resistance is typical as shown in FIG. 1, when Mo content exceeds 1.5% by weight. However, if the content exceeds 4% by weight, toughness of the stainless steel decreases, thereby affecting productivity. Hence the molybdenum content is between more than 1.5% and 4% by weight.

(Rare Earth Elements and Yttrium)

Rare earth elements and yttrium are important elements in improving high-temperature oxidation resistance in iron-chromium-aluminum stainless steels. Rare earth-elements such as lanthanum and cerium, and yttrium are effective in stabilizing aluminum oxide ($Al_2O_3$) film formed on the surface of the stainless steel, and hence in restraining abnormal oxidation which is liable to occur on the stainless steel foil. In addition, the oxide film on the steel base is stabilized by the rare earth elements and yttrium. These effects become significant if over 0.01% by weight of rare earth elements and yttrium are included in total. If the contents exceed 0.15% by weight, hot workability and toughness decrease. Moreover, nonmetallic inclusions which induce the abnormal oxidation is easily formed. As a result, the high-temperature oxidation resistance is deteriorated contrary to the intention. Therefore, one or two of the rare earth elements and yttrium are included in the range of 0.01% to 0.15% by weight in total.

(Niobium, Vanadium and Titanium Nb, V, Ti)

Adequate quantities of niobium, vanadium and titanium are arbitrarily included in the stainless steel to be bonded with carbon and nitrogen therein so that the toghness significantly improved. Niobium, vanadium and titanium are also effective in improving heat resistance of the metallic carrier of a catalyst converter which tends to be deformed through repeated heating and cooling in heat cycles. In order to prevent the deformation, it is necessary to include one or two of niobium, vanadium and titanium in content over 0.05% by weight in total. However, if the content exceeds 1% by weight, the hardness of the stainless steel becomes too high. Thus, 0.05% to 1% of niobium, vanadium and titanium is preferably included.

Examples of the present invention are described hereinafter.

High-temperature oxidation resistance of the high-aluminum-containing ferritic stainless steel is imparted by an aluminum oxide film layer formed on the surface thereof. In order to stabilize the aluminum oxide film, it is effective to increase the content of chromium. However, in an ordinary iron-chormium-aluminum stainless steel, the oxide film is not sufficiently adhered, so that the film may flake off during a cooling process of the steel, causing abnormal oxidation.

Table 1 shows results of oxidation tests performed on various ferritic stainless steel to examine influence of the components on time at which abnormal oxidation occurs. Each of the ferritic stainless steel test pieces has a thickness of 50 $\mu$m. The test pieces were inserted in a heating furnace disposed in the atmosphere and maintained at a temperature of 1150° C. The test pieces were taken out of the furnace sometimes and observed by the naked eye for inspecting abnormal oxide in the form of projection other than normally existing thin and uniform oxide film. The abnormal oxidation occurrence time shown in the table indicates a length of time until the abnormal oxide occurs. As apparent from the Table 1, the stainless steel containing rare-earth elements (REM) or yttrium has far longer abnormal oxidation occurrence time than 20Cr-5Al steel (test piece A), thus showing improved high-temperature oxidation resistance.

TABLE 1

| TEST PIECE | A | B | C |
|---|---|---|---|
| COMPONENT AND CONTENT (WEIGHT PERCENT) | | | |
| C | 0.014 | 0.023 | 0.012 |
| Si | 0.34 | 0.32 | 0.32 |
| Mn | 0.32 | 0.35 | 0.31 |
| P | 0.025 | 0.023 | 0.025 |
| S | 0.0022 | 0.0019 | 0.0022 |
| Cr | 20.05 | 20.02 | 20.09 |
| N | 0.014 | 0.014 | 0.012 |
| Al | 4.87 | 5.01 | 5.02 |
| REW | — | 0.06 | — |
| Y | — | — | 0.05 |
| ABNORMAL OXIDATION OCCURRENCE TIME | 45 | 210 | 250 |

Heretofore steel having an oxidation resistance withstanding 100 hours at 1150° C. was used for a catalyst converter carrier. However, the environment in which the present ferritic stainless steel is used has become much more severe than before as hereinbefore described. Therefore, it is presumed that the catalyst carrier has an abnormal oxidation occurrence time more than 300 hours. Hence the oxidation resistance of the stainless steels shown in Table 1 is not sufficient.

Accordingly, as shown in Table 2, the quantities of alumina, yttrium and rare-earth elements which are effective in improving high-temperature oxidation resistance were increased. The steels were melted in a 30 kg vacuum melting furnance and cast into a steel ingot. However, when the ingot was hot forged, steel was cracked. Namely, the addition of excessive quantities of aluminum, yttrium and rare-earth elements proved to be an inadequate solution from the point of productivity.

TABLE 2

| TEST PIECE | P | Q | R |
|---|---|---|---|
| COMPONENT AND CONTENT (WEIGHT PERCENT) | | | |
| C | 0.012 | 0.011 | 0.014 |
| Si | 0.33 | 0.30 | 0.30 |
| Mn | 0.37 | 0.39 | 0.39 |
| P | 0.025 | 0.025 | 0.025 |
| S | 0.0020 | 0.0019 | 0.0020 |
| Cr | 20.01 | 20.04 | 20.09 |
| N | 0.012 | 0.011 | 0.014 |
| Al | 5.08 | 6.25 | 5.07 |
| REW | 0.15 | 0.09 | — |
| Y | 0.03 | — | 0.09 |
| RESULTS OF FORGING | CRACKS FOUND | CRACKS FOUND | CRACKS FOUND |

The inventors of the present invention have conducted various studies and experiments to obtain a steel having an improved high-temperature oxidation resistance without increasing the contents of aluminum, yttrium and rare earth elements. Namely, influence of molybdenum on high-temperature oxidation resistance was investigated under the temperature of 1150° C. using ferritic stainless steel foils having a thickness of 50 µm. The stainless steels were also wrought into Honeycomb carriers for a catalytic converter having a diameter of 50 mm, length of 100 mm and a height of 1.5 mm. One-hundred cooling and heating cycles in which the test pieces were subjected to at temperatures of 900° C. and 200° C. for thirty minutes, respectively, were performed to examine the deformations thereof.

TABLE 3

| TEST PIECE | D | E | F | G | H | I |
|---|---|---|---|---|---|---|
| COMPONENT AND CONTENT (WEIGHT PERCENT) | | | | | | |
| C | 0.026 | 0.021 | 0.023 | 0.014 | 0.015 | 0.013 |
| Si | 0.31 | 0.31 | 0.32 | 0.31 | 0.34 | 0.30 |
| Mn | 0.27 | 0.24 | 0.25 | 0.29 | 0.25 | 0.30 |
| P | 0.024 | 0.024 | 0.024 | 0.025 | 0.024 | 0.025 |
| S | 0.0019 | 0.0018 | 0.0021 | 0.0023 | 0.0021 | 0.0020 |
| Cr | 20.04 | 20.08 | 20.03 | 20.09 | 20.10 | 20.07 |
| N | 0.013 | 0.011 | 0.013 | 0.012 | 0.010 | 0.012 |
| Al | 5.09 | 5.10 | 5.11 | 5.10 | 5.13 | 5.09 |
| REM | 0.09 | 0.09 | 0.09 | 0.08 | 0.09 | 0.08 |
| Mo | — | 0.19 | 0.51 | 1.13 | 2.35 | 3.87 |
| ABNORMAL OXIDATION OCCURRENCE TIME | 240 | 310 | 330 | 500 | 610 | 740 |
| DEFORMATION | FOUND | NOT FOUND | NOT FOUND | NOT FOUND | NOT FOUND | NOT FOUND |

As shown in Table 3, the abnormal oxidation occurrence time in each of the test pieces which includes molybdenum was extremely extended, that is, the high-temperature oxidation resistance was remarkably improved. The results show that the molybdenum acts to enhance the oxidation resistance characteristic of the aluminum oxide ($Al_2O_3$) formed on the iron-chromium-aluminum stainless steel including rare-earth elements and yttrium. The reason of the improvement in the high-temperature oxide resistance is not quite clear but is assumed that molybdenum dissolves in the aluminum oxide film, thereby covering defects of the oxide film, preventing the oxygen from entering. Additionally, deformation of the steel did not occur through the cooling and heating cycles so that it can be said that the heat resistance is also improved.

Thus, the high-aluminum-containing ferritic stainless steel of the present invention including molybdenum has better resistance against high-temperature oxidation and has a high-temperature strength compared to a conventional iron-chromium-aluminum stainless steel with or without rare earth elements and yttrium.

The examples of the ferritic stainless according to the present invention are described hereinafter.

Each of components of the ferritic stainless steel listed in Table 4 was vacuum-melted, forged, cut and hot-rolled, and thereafter repeatedly annealed and cold-rolled to form a piece of foil having a thickness of 50 μm. The test piece was heated for the oxidation test at 1150° C. until oxidation was observed. The stainless steel foil was further wrought into a honeycomb carrier for a catalytic converter. Five-hundred cooling and heating cycles each of which comprising keeping the test piece in an exhaust gas atmosphere at a temperature of 200° C. for five minutes and thereafter at a temperature of 900° C. for thirty minutes. The abnormal oxidation occurrence time of each specimen and the deformation of the honeycomb made from the specimen were examined as shown in Table 4.

TABLE 5

| SPECIMEN No. | PRESENT INVENTION | | COMPARATIVE EXAMPLE | |
|---|---|---|---|---|
| | 21 | 22 | 23 | 24 |
| COMPONENT AND CONTENT (WEIGHT PERCENT) | | | | |
| C | 0.015 | 0.013 | 0.013 | 0.014 |
| Si | 0.31 | 0.31 | 0.33 | 0.32 |
| Mn | 0.23 | 0.25 | 0.21 | 0.18 |
| P | 0.025 | 0.024 | 0.025 | 0.024 |
| S | 0.0021 | 0.0019 | 0.0019 | 0.0022 |
| Cr | 20.06 | 20.05 | 20.08 | 20.03 |
| N | 0.015 | 0.014 | 0.015 | 0.013 |
| Al | 5.11 | 5.08 | 5.10 | 5.12 |
| La | 0.10 | — | — | 0.09 |
| Y | — | 0.09 | — | — |

TABLE 4

| Specimen No. | C | Si | Mn | P | S | Cr | Al | N | La | Ce | Y | Mo | Remainder | Abnormal Oxidation Occurrence Time (Hours) | Deformation |
|---|---|---|---|---|---|---|---|---|---|---|---|---|---|---|---|
| Present Invention | | | | | | | | | | | | | | | |
| 1 | | | | | | | | | 0.03 | 0.02 | — | 0.51 | | 320 | Not Found |
| 2 | | | | | | | | | 0.05 | — | — | 1.08 | | 490 | Not Found |
| 3 | 0.019 | 0.32 | 0.24 | 0.024 | 0.0019 | 20.04 | 5.11 | 0.010 | — | — | 0.07 | 2.09 | | 590 | Not Found |
| 4 | 0.012 | 0.33 | 0.22 | 0.025 | 0.0020 | 20.06 | 4.95 | 0.017 | 0.02 | 0.01 | 0.02 | 3.12 | | 700 | Not Found |
| 5 | 0.011 | 0.30 | 033 | 0.025 | 0.0015 | 16.03 | 5.73 | 0.013 | 0.06 | — | — | 2.01 | | 420 | Not Found |
| 6 | 0.014 | 0.34 | 0.26 | 0.025 | 0.0022 | 23.05 | 3.26 | 0.013 | 0.03 | 0.02 | 0.02 | 2.14 | | 380 | Not Found |
| 7 | | | | | | | | | 0.03 | — | 0.02 | 2.12 | Nb:0.29 V:0.11 | 410 | Not Found |
| 8 | | | | | | | | | 0.08 | — | — | 1.97 | Ti:0.22 | 420 | Not Found |
| 9 | | | | | | | | | 0.05 | — | — | 2.10 | V:0.07 | 320 | Not Found |
| 10 | | | | | | | | | — | 0.06 | — | 3.94 | Ti:0.31 | 320 | Not Found |
| Comparative Example | | | | | | | | | | | | | | | |
| 11 | 0.014 | 0.34 | 0.24 | 0.025 | 0.0021 | 20.12 | 5.02 | 0.012 | 0.03 | 0.03 | — | — | | 240 | Found |
| 12 | 0.017 | 0.31 | 0.31 | 0.024 | 0.0021 | 20.22 | 5.19 | 0.014 | 0.05 | — | — | — | | 250 | Found |
| 13 | 0.019 | 0.30 | 0.33 | 0.024 | 0.0023 | 20.24 | 5.01 | 0.016 | — | — | 0.05 | — | | 240 | Found |
| 14 | 0.012 | 0.34 | 0.32 | 0.025 | 0.0020 | 20.11 | 4.99 | 0.017 | 0.03 | 0.01 | 0.02 | — | | 190 | Found |
| 15 | 0.011 | 0.30 | 0.31 | 0.025 | 0.0015 | 16.11 | 5.68 | 0.013 | 0.06 | — | — | — | | 170 | Found |
| 16 | 0.014 | 0.33 | 0.31 | 0.025 | 0.0019 | 22.98 | 3.35 | 0.012 | 0.03 | 0.02 | 0.02 | — | | 190 | Found |
| 17 | | | | | | | | | 0.03 | — | 0.02 | — | Nb:0.25 V:0.13 | 120 | Some Found |
| 18 | | | | | | | | | 0.07 | — | — | — | Ti:0.19 | 130 | Some Found |
| 19 | | | | | | | | | 0.05 | — | — | — | V:0.09 | 110 | Some Found |
| 20 | | | | | | | | | — | 0.06 | — | — | Ti:0.29 | 90 | Some Found |

As is understood from the Table 4, each of the specimens according to the present invention has excellent high-temperature oxidation resistance. Namely, oxidation did not appear for over 300 hours in the examples of the present invention, whereas the comparative stainless steels without molybden assumed abnormal oxidation within 300 hours. Thus, the stainless steel of the present invention satisfies the desired characteristics for a catalyst carrier of an automotive catalytic converter. Furthermore, no deformation occurred in the test piece of the present invention. To the contrary, deformation was observed in the comparative example, that is, in specimens Nos. 11 to 16. Each of the specimens Nos. 17 to 20 having niobium, vandium and titanium has a slight effect to prevent the deformation, but is not sufficient.

The components of the stainless steels shown in Table 5 were melted in 30 kg vacuum melting furnance, forged and annealed. In accordance with the testing method defined in JIS (Japanese Industrial Standard) G057, test pieces, each having a length of 50 mm at a parallel portion and a diameter of 10 mm were cut out from the ferritic stainless steel. The tension test for examining 0.2% proof stress and tensile strength was conducted at 800° C.

| | | | | |
|---|---|---|---|---|
| Mo | 2.02 | 2.12 | — | — |
| 0.2% PROOF STRESS (kg/mm²) | 6.8 | 5.1 | 4.2 | 4.4 |
| TENSILE STRENGTH (kg/mm²) | 9.9 | 7.2 | 6.0 | 6.4 |

As shown in Table 5, test pieces of specimens Nos. 21 and 22 of the present invention had both higher proof stress and tensile strength than those of comparative examples, specimens Nos. 23 and 24, thus, showing improved strength at high temperature.

The test results show that the stainless steel in accordance with the present invention has excellent high-temperature oxidation resistance so that the abnormal oxidation is unlikely to occur. Moreover, the stainless steel has excellent durability to cooling and heating testing cycles and has a sufficient high-temperature strength.

From the foregoing, it will be understood that the present invention provides a high-aluminum-containing ferritic stainless steel which has improved high-temperature oxidation resistance and high-temperature strength without increasing the amounts of chromium, aluminum and rare earth elements. The stainless steel of the present invention is hence extensively suitable for high-temperature applications such as a catalyst carrier of a catalytic converter provided as an emission control equipment, heating device and electric heating element.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A ferritic stainless steel excellent in high temperature oxidation resistance consisting by weight of less than 0.03% carbon, less than 1% silicon, less than 1% manganese, less than 0.04% phosphorus, less than 0.03% sulphur, from 15% to 25% chromium, less than 0.03% nitrogen, from 3% to 6% aluminum, more then 1.5% to 4% molybdenum, from 0.01% to 0.15% at least one rare-earth elements and yttrium, and the balance being Fe except for inevitable impurities.

2. A substrate of a catalytic converter comprising a ferritic stainless steel consisting by weight of less than 0.03% C, less than 1% Si, less than 1% Mn, less than 0.04% P, less than 0.03% S, 15-25% Cr, less than 0.03% N, 3-6% Al, more than 1.5% up to 4% Mo, 0.01-0.15% at least one rare earth elements and Y, and the balance being Fe except for inevitable impurities.

* * * * *